Dec. 6, 1949     C. G. MINOR     2,490,535
REFRIGERATOR
Filed Aug. 3, 1946     8 Sheets-Sheet 1
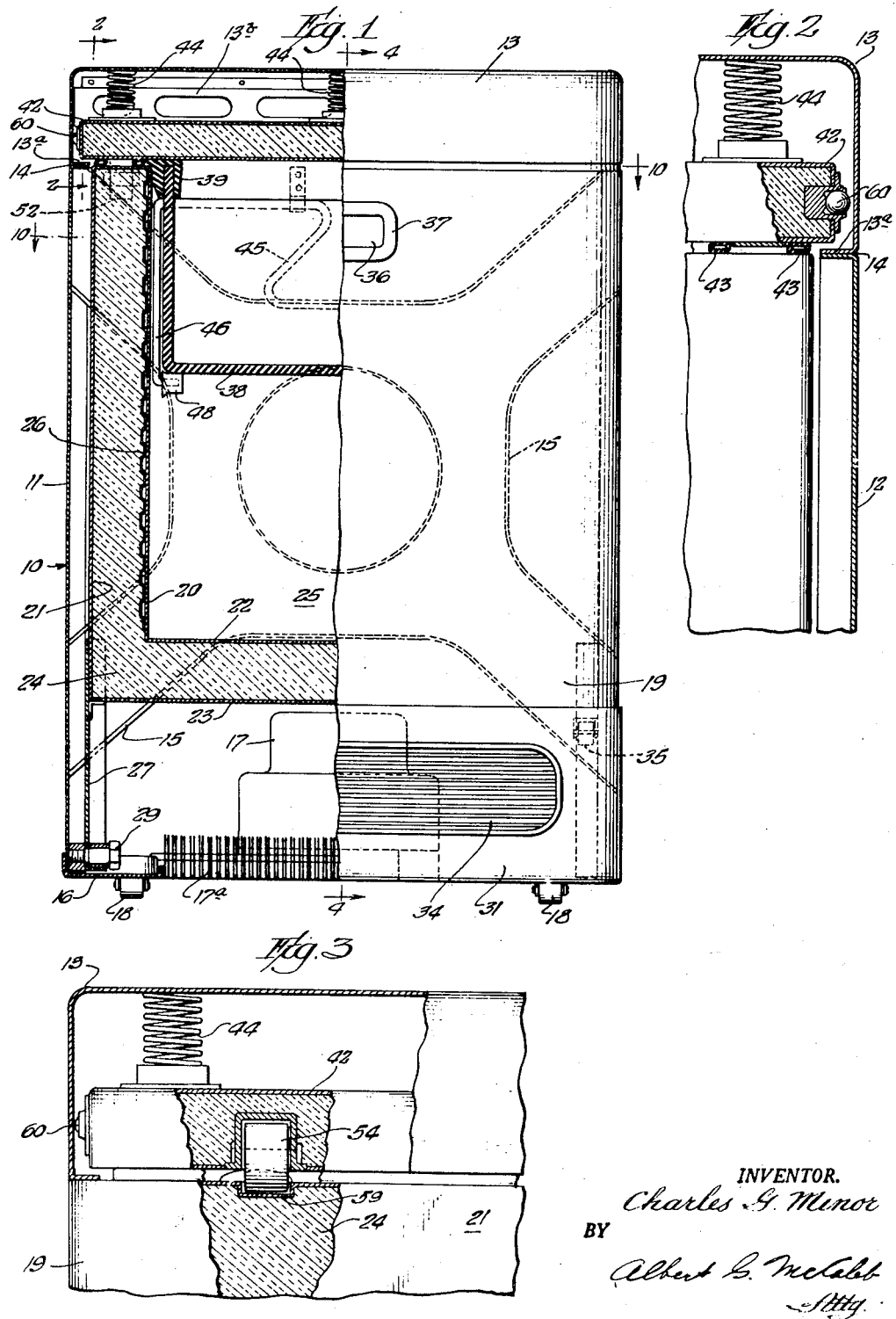
INVENTOR.
Charles G. Minor
BY
Albert G. McCabb
Atty.

Dec. 6, 1949   C. G. MINOR   2,490,535
REFRIGERATOR
Filed Aug. 3, 1946   8 Sheets-Sheet 2
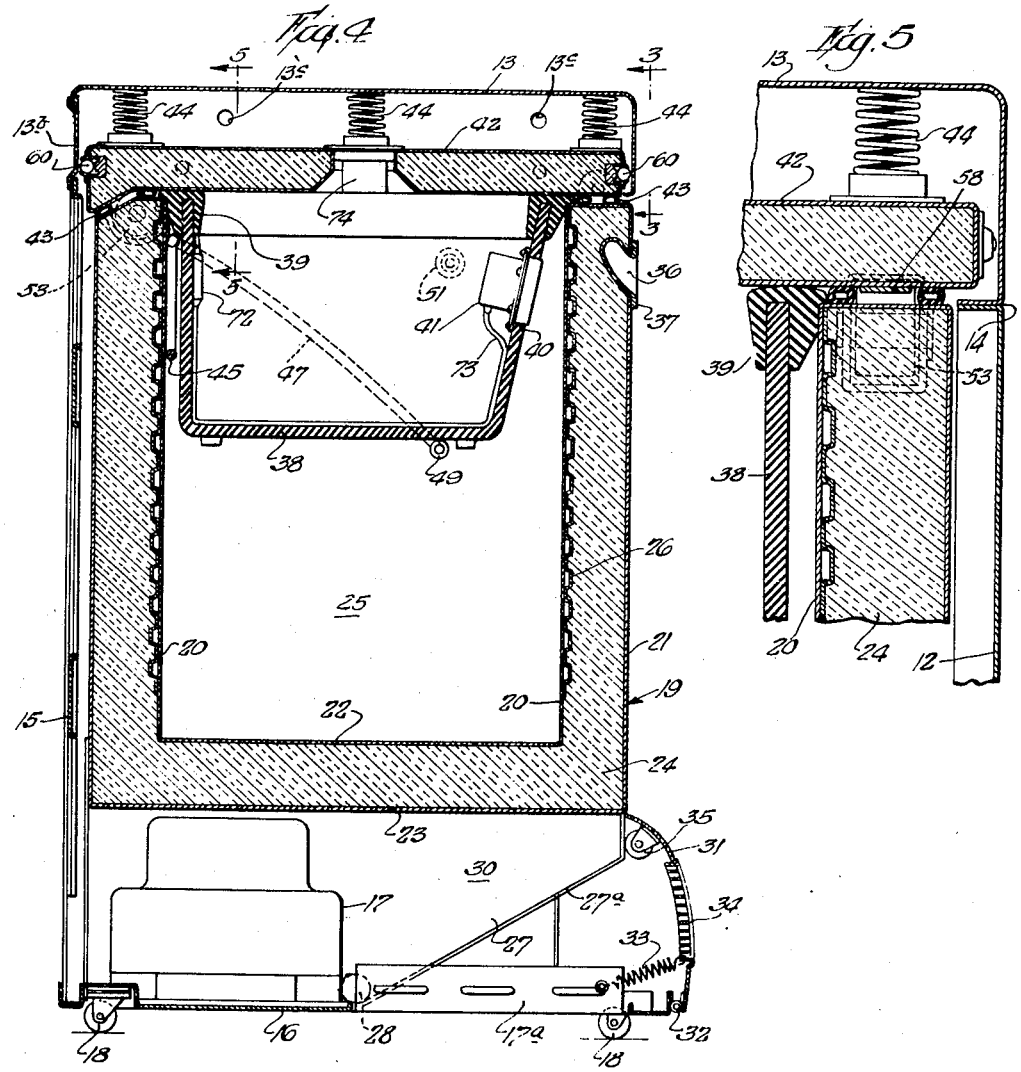
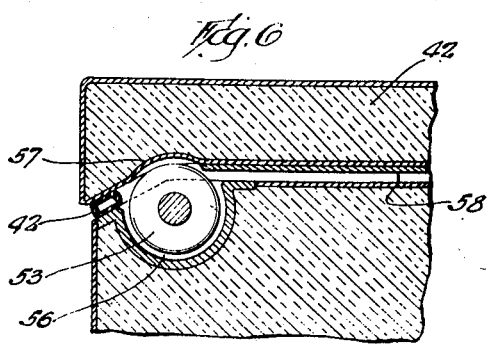
INVENTOR.
Charles G. Minor
BY
Albert G. McCaleb
Atty.

Dec. 6, 1949     C. G. MINOR     2,490,535
REFRIGERATOR
Filed Aug. 3, 1946     8 Sheets-Sheet 3
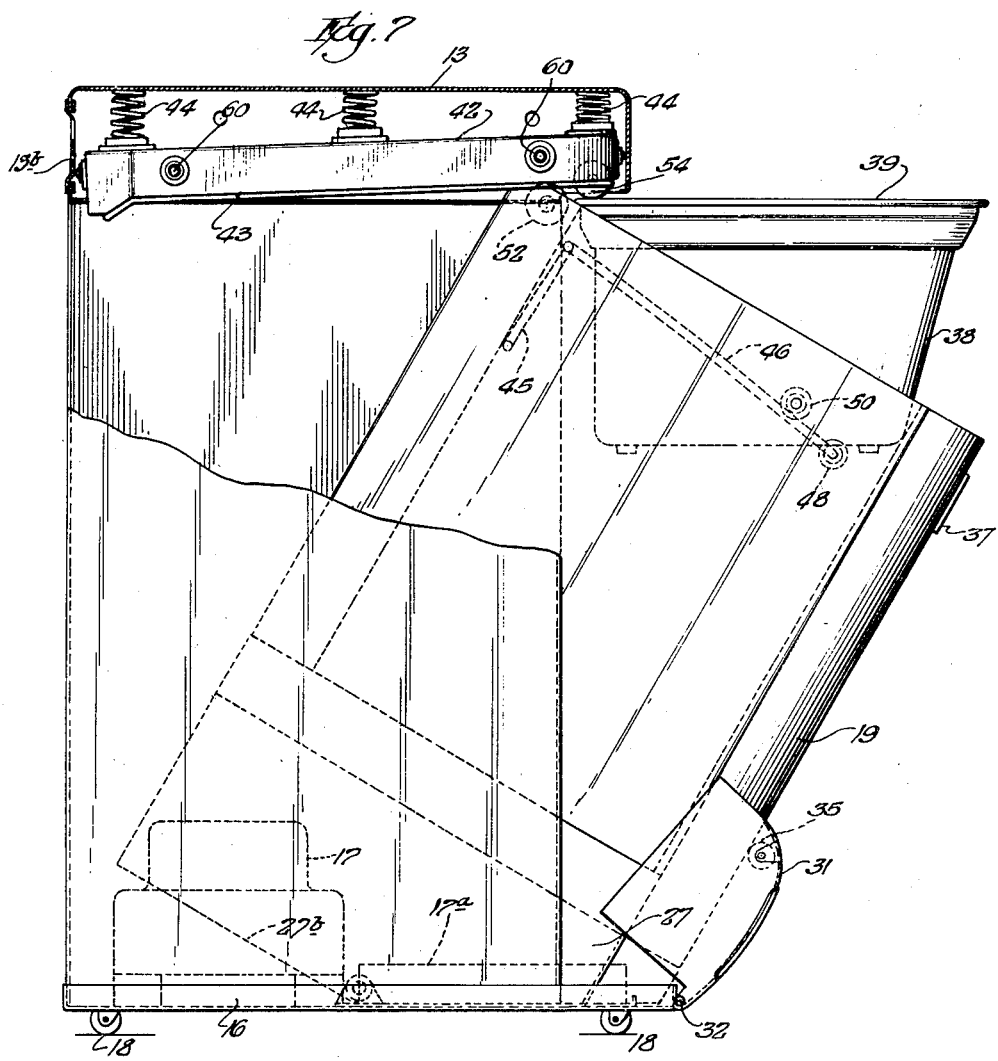
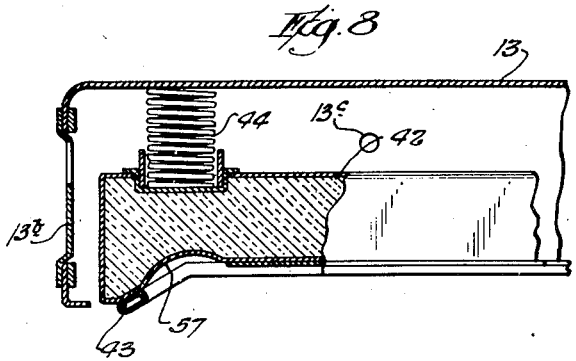
INVENTOR.
Charles G. Minor
BY
Albert G. McCaleb
Atty.

Dec. 6, 1949 C. G. MINOR 2,490,535
REFRIGERATOR
Filed Aug. 3, 1946 8 Sheets-Sheet 4
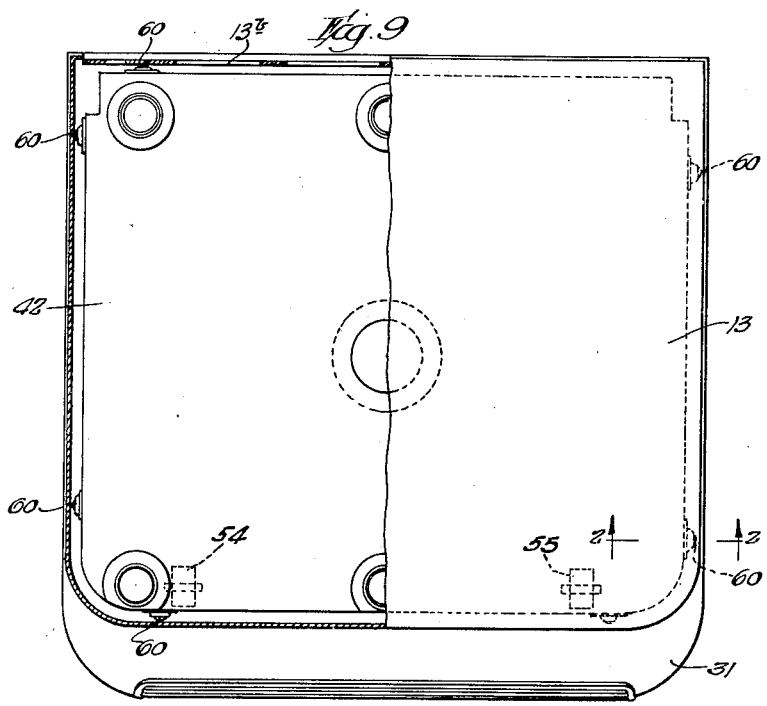
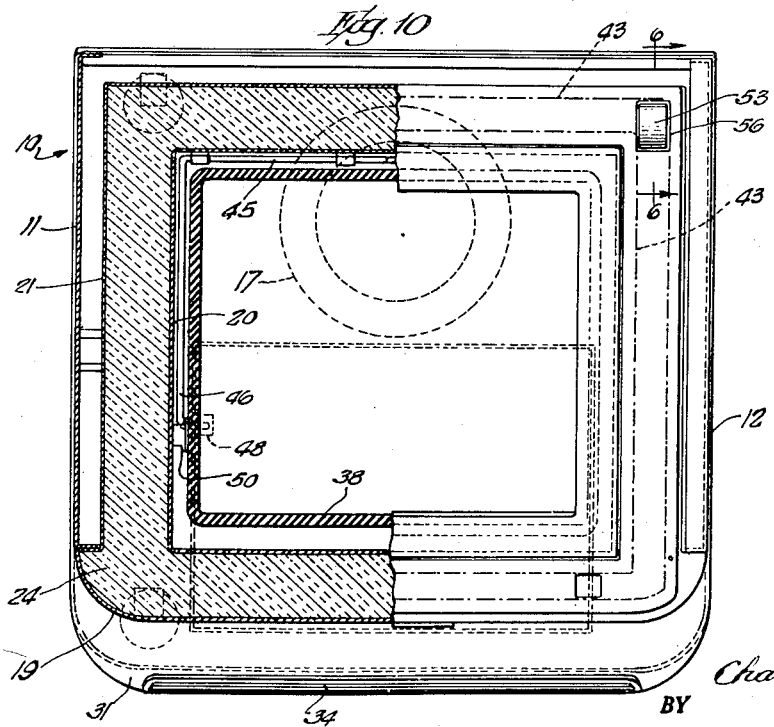
INVENTOR.
Charles G. Minor
BY
Albert G. McCaleb
Atty.

Dec. 6, 1949 C. G. MINOR 2,490,535
REFRIGERATOR
Filed Aug. 3, 1946 8 Sheets-Sheet 5
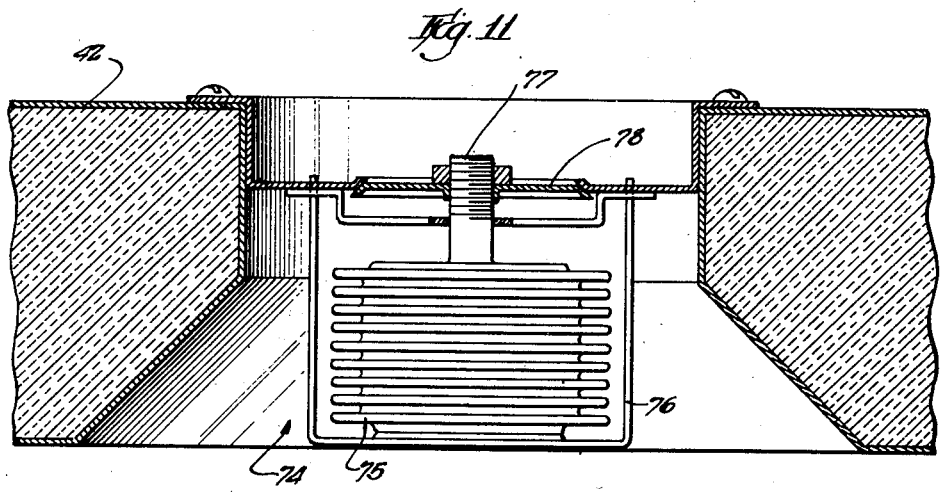
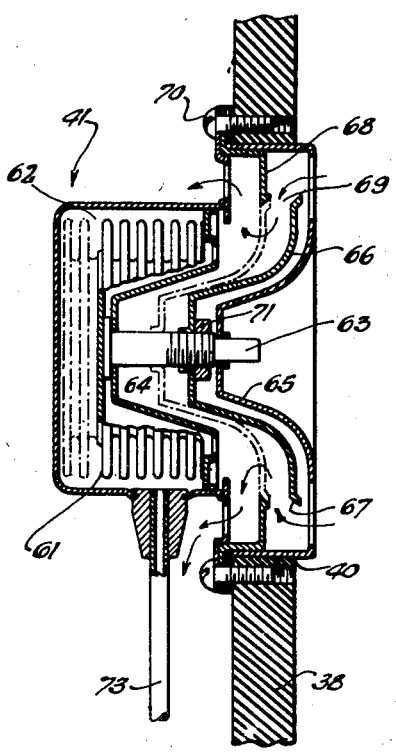
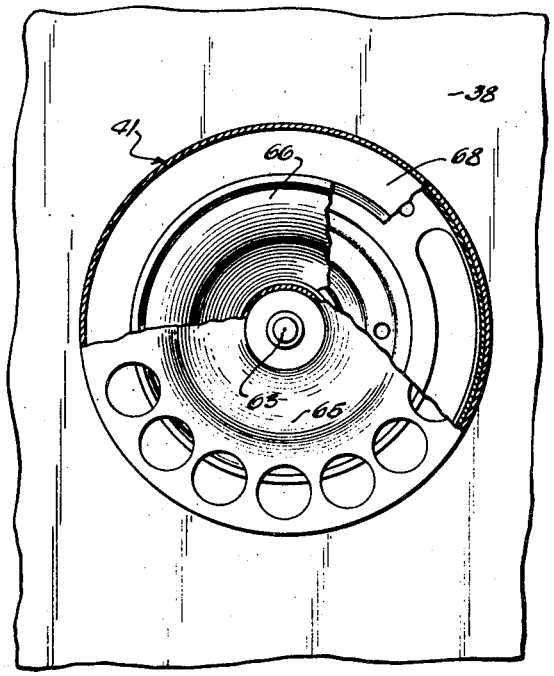
INVENTOR.
Charles G. Minor
BY
Albert G. McCaleb
Atty.

Dec. 6, 1949
C. G. MINOR
2,490,535
REFRIGERATOR
Filed Aug. 3, 1946
8 Sheets-Sheet 6
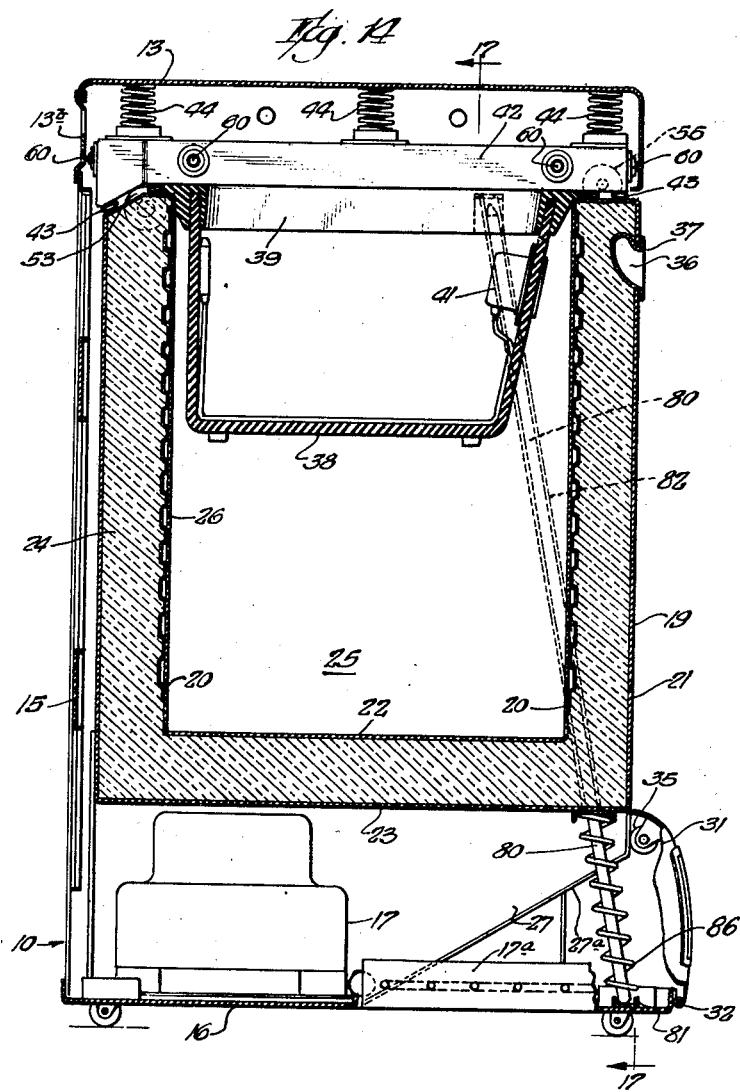
INVENTOR.
Charles G. Minor
BY
Albert G. McCaleb
Atty.

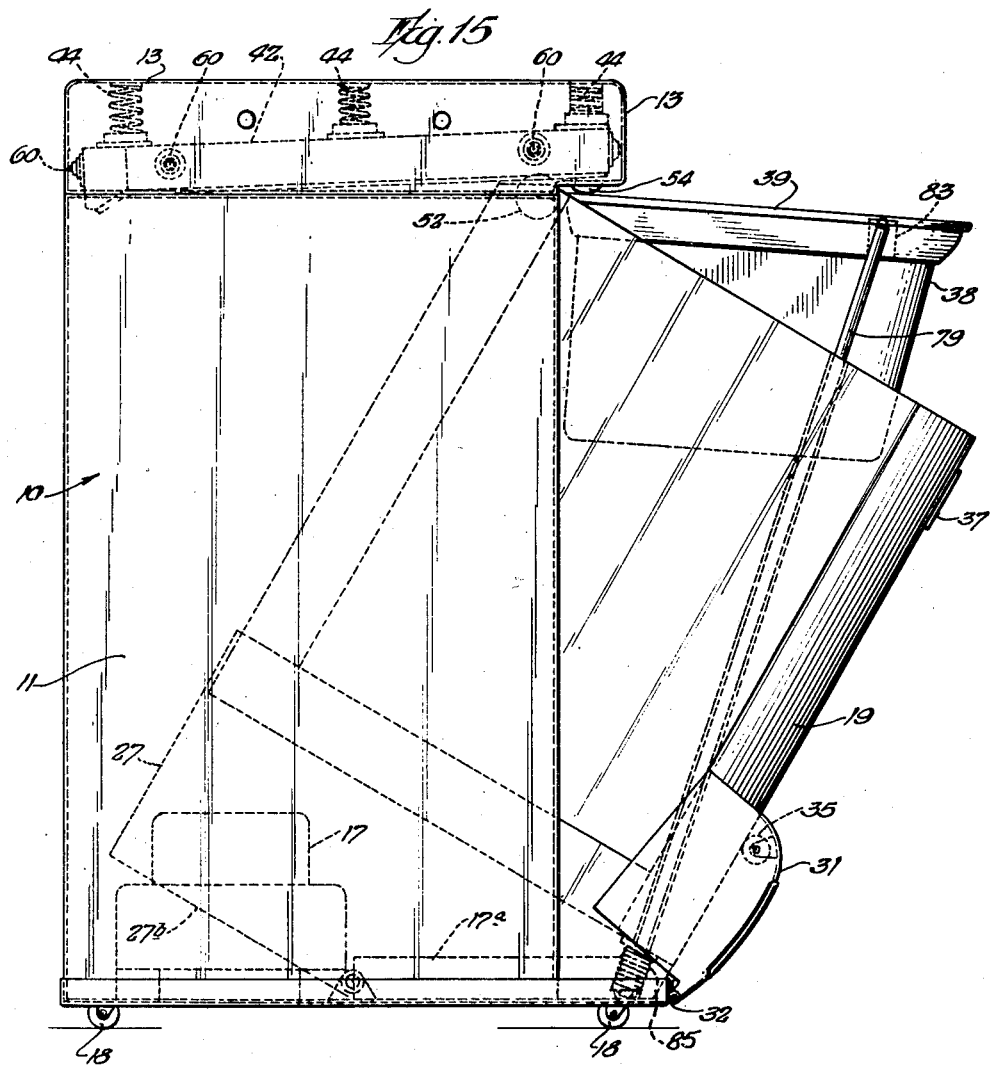

Dec. 6, 1949     C. G. MINOR     2,490,535
REFRIGERATOR
Filed Aug. 3, 1946     8 Sheets-Sheet 8
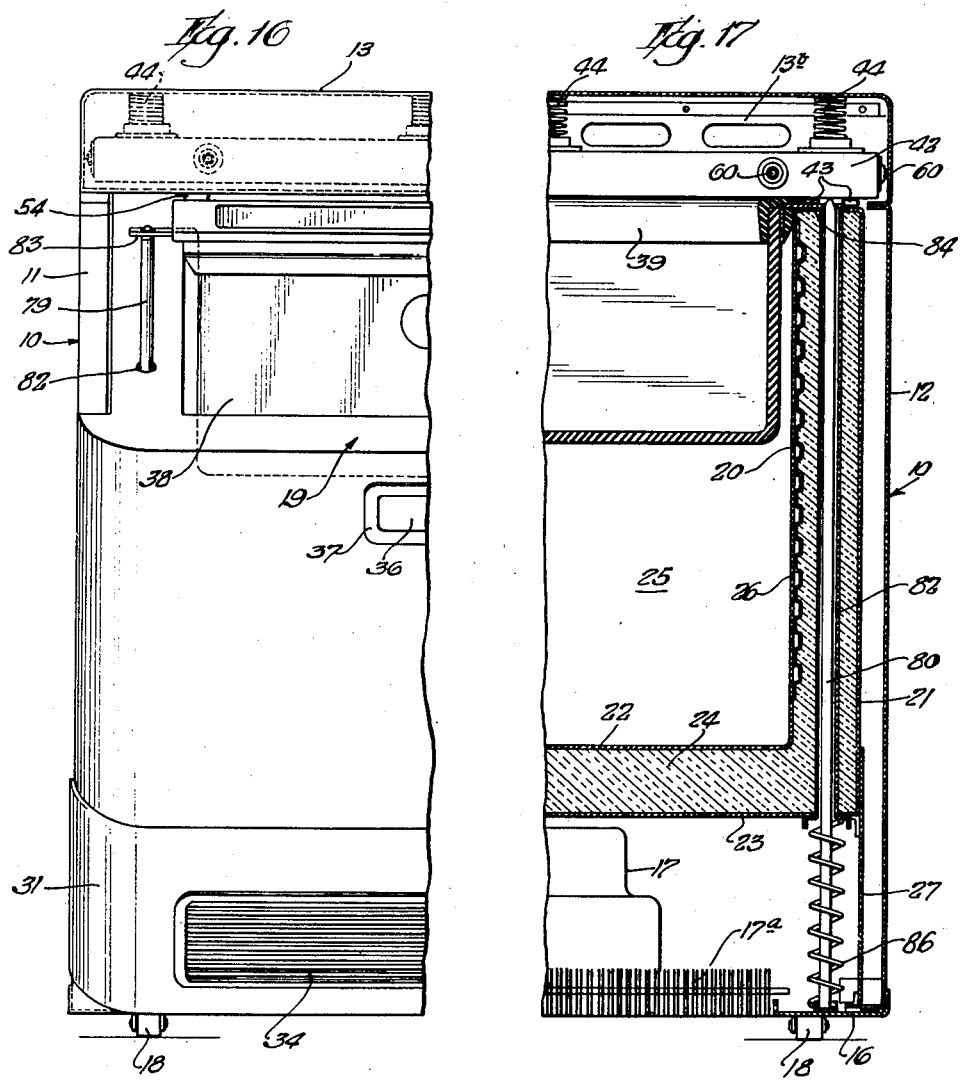
INVENTOR.
Charles G. Minor
BY
Albert C. McCaleb
Atty.

Patented Dec. 6, 1949

2,490,535

UNITED STATES PATENT OFFICE 2,490,535

REFRIGERATOR

Charles G. Minor, Evanston, Ill., assignor of one-half to Albert G. McCaleb, Evanston, Ill.

Application August 3, 1946, Serial No. 688,372

7 Claims. (Cl. 62—89)

This invention relates to mechanical refrigerators and has to do more especially with refrigerators designed for domestic use.

The subject matter of this application is in some respects closely related to that of my copending application Serial No. 649,240, filed February 21, 1946, and reference may be had to said application for a more detailed description than is herein set forth of such features as are common to the two cases.

One of the objects of the present invention is to provide a refrigerator of simple and compact construction embodying both a freezing compartment for the freezing of foods and the like and the storage of frozen foods and a higher temperature compartment suitable for ordinary refrigeration purposes and which is particularly well adapted for use where space is at a premium as is often the case in small homes and apartments.

My invention has for another object the provision of a refrigerator wherein the entire storage space may be utilized for the storage of frozen foods when desired, or by the insertion of a heat insulated container, two storage compartments are provided—one for frozen foods and the like, and the other for the preservation of materials at temperatures above freezing.

Another object, in common with that of my above identified copending application, is to provide a domestic mechanical refrigerator in which the food storage chamber is tiltable, as a unit, out of the cabinet in which it is housed to afford convenient access to the interior from the top thereof while leaving the upper surface of the cabinet or housing undisturbed, so that it is conveniently usable as a shelf or table on which to place dishes and articles of food during the process of putting and taking such articles into and out of the food compartments.

Still another object of my invention is to provide a refrigerator for domestic use having food storage compartments below and above freezing temperatures embodied in a single tiltable unit and so constructed that the higher temperature food storage container is maintained at all times in a substantially upright position notwithstanding the tilting of the unit, thus avoiding possible spilling of milk and other fluids which may be stored in the higher temperature container.

A further object is to provide a refrigerator of the above indicated character which can be manufactured to sell at a relatively low price without sacrifice of quality.

One of the novel features of my invention, and one which can be employed in many different ways in addition to that herein specifically illustrated and described, consists in the provision of a temperature-controlled interconnection between a low temperature compartment (wherein the temperature is below 32° F.) and a separate and distinct food storage container wherein the refrigeration temperature is much higher than that maintained in the low temperature compartment, said temperature-controlled interconnection comprising a valve which operates automatically to enable interchange of air between the higher temperature food container and the low temperature compartment, thus keeping the higher temperature container at the desired temperature without the necessity of providing an additional evaporator for that purpose.

Another feature, which is closely related to the one above mentioned and which preferably is employed as an adjunct thereto, consists in the provision of a second temperature-controlled valve which automatically establishes communication between the outside atmosphere and the interior of the higher temperature food container in event of the temperature within the latter dropping below a predetermined temperature range which it is desired to maintain therein. The termal insulation between the two food storage compartments preferably is sufficient so that the second valve will open only at rare intervals, thus restricting to a minimum the power loss incident to the interchange of air.

Still another feature of my invention resides in the combination of a container within a container. The main container provides a low temperature storage compartment and into the top of this is nested a second food container in which a higher refrigerating temperature is maintained. The second container is in heat-transferring relationship to the low temperature compartment and is readily removable therefrom so as to provide access to the low temperature compartment.

When the present invention is embodied in a structure wherein the food storage unit is arranged to be tilted bodily for gaining access thereto, it is desirable to maintain the second or upper food container constantly in an upright position, or nearly so, in order to avoid spilling milk and other fluids likely to be stored therein; and I have devised some novel mechanisms which are hereinafter described and which are effective to that end. These constitute further features of my invention.

An additional feature resides in a novel spring-pressed floating lid which serves as a closure for the food-containing unit and is pressed downwardly thereagainst by coil springs which are yieldable to allow the lid to rise when the food-containing unit is tilted from closed to open posture and vice versa. Among other considerations this feature makes for manufacturing economy while insuring a perfect seal all around, and at the same time it preserves the level top construction which is a great convenience in that it enables the refrigerator to be used as a kitchen table.

It is my idea that refrigerators constructed according to the present invention will ordinarily be low enough in height to serve as kitchen tables; but even where that may not be true they generally will be low enough so that the top surface can conveniently be employed as a shelf, and for that reason it is desirable to avoid the necessity of tilting the top each time the unit is opened and closed.

The foregoing and other objects and advantages of the invention will be apparent from the following description and the accompanying drawings in which similar characters of reference indicate similar parts throughout the several views.

In the drawings which accompany this specification, Figs. 1 to 13 inclusive, illustrate one preferred embodiment of the invention, while Figs. 14 to 17, inclusive, depict an alternative or modified form of the invention.

Referring to the drawings, of which there are eight sheets:

Fig. 1 is a frontal view, half in elevation and half in vertical section, of a mechanical refrigerator embodying a preferred form of my invention;

Fig. 2 is a corner detail, in section, taken along a line 2—2 of Fig. 2 and showing, on an enlarged scale, the interior construction at the upper right hand corner of Fig. 1;

Fig. 3 is a detail view, somewhat enlarged, taken substantially at a line 3—3 of Fig. 4, except portions which are shown in section, which latter are taken to the left of line 33, as will be self-evident;

Fig. 4 is a vertical sectional view taken substantially at a line 4—4 of Fig. 1;

Fig. 5 is a sectional view taken substantially at a line 5—5 of Fig. 4;

Fig. 6 is a sectional detail taken substantially at a line 6—6 of Fig. 10;

Fig. 7 is a side elevational view, partly in section, showing the food storage unit in its out or open position;

Fig. 8 is a fragmentary sectional view, drawn to an enlarged scale, taken at the upper left hand corner of Fig. 7;

Fig. 9 is a top view, partially in plan and partially in section, with the section taken immediately below the top of the outer housing;

Fig. 10 is a top sectional view taken approximately at a line 10—10 of Fig. 1;

Fig. 11 is a vertical sectional view of the thermostatically controlled valve which regulates the introduction of outside air to the higher temperature food storage refrigeration compartment;

Fig. 12 is a sectional view of the thermostatically controlled valve which automatically opens and closes the passageway between the low and higher temperature food storage compartments;

Fig. 13 is a face or plan view of the valve shown in Fig. 12;

Fig. 14 is a vertical sectional view of a modified refrigerator similar to that of Figs. 1 to 13, except that it illustrates a different means for maintaining the upper food container in upright posture when the refrigerator unit is tilted forwardly;

Fig. 15 is a side elevational view of the same refrigerator showing the food storage unit in its open or forwardly tilted position;

Fig. 16 is a frontal half view with the food storage unit open; and

Fig. 17 is a sectional view taken along the irregular line 17—17 of Fig. 14.

The structure of the refrigerator depicted for exemplary purposes in Figs. 1 to 13 comprises a formed sheet metal housing or cabinet 10, including side walls 11 and 12 and a top 13 which may be either removable from the side walls or fixedly connected thereto. The top and side walls are joined at 14. The back of the housing consists preferably of a formed sheet metal X-brace 15 which may be either integral with or otherwise secured to the side walls, as by welding. The housing is generally rectangular in shape and open at the front except along the top border margin which is constituted by the front face of the top 13. The side walls are interconnected at the bottom by a floor plate 16 on which is mounted a compressor unit 17 and a condenser unit 17a. The whole structure is preferably mounted on casters 18 which are suitably attached to the housing.

Mounted within the housing is a generally rectangular food storage refrigeration unit 19 made of sheet metal inner and outer wall plates 20 and 21 and inner and outer bottom plates 22 and 23. The space between the inner and outer plates is filled with a suitable thermal insulating material 24. The inner wall plates and inner bottom plate define a rectangular chamber 25 which constitutes a low temperature compartment which is open at the top for access, and the low temperature therein is maintained by a surrounding evaporator coil 26 extending the full height of the rectangular chamber and which is connected to the condenser and compressor by flexible connections to provide the usual circulation of refrigerant.

Extending downwardly from the main body of unit 19 and forming integral parts of the unit are a pair of plates 27. These are connected to either side of the main body and pivotally connected at 28 to a pair of shouldered cap screws 29. Plates 27 are cut obliquely along line 27a to permit unit 19 to be tilted forwardly as depicted in Fig. 7. The rear lower edges 27b of plates 27 extend horizontally when the unit is upright, as illustrated in Fig. 4, and they serve to limit the backward or inward movement of the unit. The space 30 underneath unit 19 is closed at the front by a closure plate 31 which is hinged at 32 and held at its upper edge closely adjacent the front face of the unit by a spring 33, which permits the closure plate to rotate on its hinge when the unit is tilted. Plate 31 is provided with louver openings 34 to admit air to space 30, although such louvers may be unnecessary if the bottom of the housing is left open sufficiently to permit a free circulation of air over the radiating surface of the condenser. Rollers 35 carried by closure plate 31 bear against the front of the unit and serve to hold the upper edge of the closure in spaced relation to the unit so that it will not scrape thereon when the unit is tilted.

A recess 36 is formed in the upper front face of unit 19 to provide a manual grip for tilting the unit outwardly, and this is finished off with an escutcheon plate 37.

In my previously mentioned copending application, I have illustrated and described suitable spring means for aiding in the return of the unit to its upright position, and dashpot means effective to cushion the return movements of the unit. Those adjuncts are applicable to the structure now being described, but they have been omitted herein in order to simplify the disclosure. Reference may be had to said copending application for details concerning said spring and dashpot means; but it is to be observed that those features are not essential to the operation of the present structure and are in no way directly related to the subject matter herein claimed, although it is desirable that similar provisions be added.

Suspended from the top inner edge of unit 19 and nested in the upper portion of the low temperature compartment 25 is a basket-like container 38 made preferably of a material having good thermal insulation properties as, for example, a phenol fiber plastic or hard rubber. The interior of this container is intended to be maintained at a temperature well above 32° F. and is designed to receive foodstuffs which are to be preserved but not frozen. A gasket 39 of special design and made of a resilient material such as soft rubber or a synthetic rubber like material is firmly attached all around to the upper edge of container 38 and has an outwardly extending flange by means of which said container is suspended on the upper inside edge of unit 19.

The temperature within container 38 is maintained in part by conduction through its walls, but its thermal insulating properties should be such that not enough heat transfer will be effected by wall conduction to cause the temperature inside said container to go as low as the temperature in the low temperature compartment. Otherwise the temperature within container 38 would tend toward such a low level that it would be necessary frequently to admit outside air in order to maintain the desired above-freezing temperature.

For the purpose of effecting a positive control of the temperature inside container 38, I provide an opening 40 through one wall thereof and a thermostatic valve 41 for controlling the passage of air through said opening. When said valve is open an interchange of air takes place between the low temperature compartment and the interior of container 38, which serves to lower the temperature within the latter. Valve 41 is shown in detail in Figs. 12 and 13 and will be described later.

The open upper end of unit 19 is thermally sealed when in closed position by a cover 42 which preferably comprises a sheet metal shell filled with thermal insulating material. A pair of continuous gaskets 43, 43 are attached to the under side of cover 42 and interposed between said cover and the top face of unit 19; and downward pressure is brought to bear upon said cover and against said gaskets by means of several coil springs 44, the upper ends of which bear against the under surface of top 13. The gaskets 43, 43 serve as a secondary seal when the container 38 is used, since the cover also seals against the gasket 39 thereon. Springs 44 serve to maintain a tight joint between the cover and the top of unit 19 and between the cover and gasket 39 while at the same time enabling the cover to rise to a limited extent in order to clear the unit when it is tilted from closed to open position and upon restoration to closed position.

Cover 42 has an opening at its center in which is fitted a second thermostatically controlled valve 74, which is shown in detail in Fig. 11 and described hereinafter. Air circulation through openings 13c in the side portions of the top 13 assists the interchange of air through the valve 74 when it is open. The function of this valve is to admit outside air into container 38 in event the temperature therein gets too low. It is preferable that the walls of container 38 be sufficienty good thermal insulators so that the temperature within the container will always be controlled by valve 41, in which event valve 74 will open only on rare occasions, if at all, so long as valve 41 remains in good working order.

A spring member 45 attached to the rear inner wall of unit 19 has a pair of forwardly and downwardly extending resilient arms 46, 47 located at either side of container 38 and each provided at its free end with a roller 48, 49 which underlies the under surface of container 38 and presses upwardly thereon. The stiffness of resilient arms 46, 47 is such that the forward portion of container 38 is lifted as unit 19 is tilted forwardly. This is clearly illustrated in Fig. 7, from which it will be seen that container 38 maintains nearly the same level irrespective of the positions of unit 19. This is necessary in order to prevent spilling of fluids in the container; but it is not necessary to observe any such precaution with respect to the contents of the low temperature compartment because materials are preserved in their solid state in that part of the refrigerator.

The upward movement of resilient arms 46 and 47 is limited by a pair of stops 50, 51 which are secured to side walls of compartment 25.

When, from time to time, which is infrequent in normal use, it is necessary to obtain access to the low temperature compartment, container 38 is lifted out and may be placed on the flat upper surface of top 13 or in any other convenient place.

For the purpose of lifting cover 42 sufficiently to clear the top of unit 19 when the latter is being tilted from the closed to the open position, and again during restoration to the closed position, there are provided two rear rollers 52, 53 and two forward rollers 54, 55. The two rear rollers, 52, 53, are carried by unit 19 near the two upper rear corners, as best shown in Figs. 6 and 10, and they are partially sunk into recesses 56 formed in the unit (Fig. 6) so that only the upper surfaces of their peripheries are disposed above the body of the unit while it is being tilted (Fig. 7). Cover 42 likewise is provided with recesses 57 (Fig. 6) designed to clear rollers 52, 53 when the unit is closed, thus permitting the cover to seat firmly on gaskets 43. A pair of tracks 58, 58 in the form of metal strips are attached to the under side of cover 42, each in line with one of the rear rollers 52, 53, and said rollers bear against said tracks and press upwardly thereon, thus raising the cover when the unit is tilted forwardly and also during the return movement thereof.

Front rollers 54 and 55 are carried by cover 42, as shown most clearly in Fig. 3, and they project downwardly therefrom so as initially to engage the adjacent top surface of unit 19 to break the gasket seal, and then to roll along the upper side faces of gasket 39 to prevent that gasket from contacting the lower edge of the top 13 during the forward and backward movements of said unit. They normally extend into recesses 59 (Fig. 3) so that they clear the top of the unit, when closed, and thus permit the forward portion of the cover to bear down firmly on gaskets 43. As unit 19 is tilted forwardly, front rollers 54 and 55 initially ride out of the recesses 59 onto the top surface of the unit and momentarily lift the front portion of the cover. This occurs simultaneously with the lifting of the rear portion of the cover by rollers 52, 53. During continued movement of the unit 19, the cover is lifted by the rear rollers so as to clear the unit and is additionally supported by side flanges 14.

Cover 42 is not hinged but is held in its proper position laterally by housing top 13, and, in order to prevent undue friction between said cover and the housing top—which friction might otherwise cause the cover to bind and thus move up and down only with difficulty, or not at all— I have attached to the four edges of the cover eight ball bearings 60 (see especially Fig. 2) which are adapted to roll in their sockets if and when they come into contact with the adjacent inside surfaces of housing top 13. By virtue of this provision, the cover will rise and fall freely notwithstanding contact with top 13. To facilitate installation and removal of the cover, a removable plate 13b comprises part of the top and is held in place by fastening means such as screws.

When unit 19 is in the open position, as shown in Fig. 7, the rear portions of the side edges of cover 42 rest on the side flanges 13a which are an integral part of housing top 13.

The thermostatically controlled valve 41, shown in Figs. 12 and 13, is of the Sylphon bellows type and is actuated by the expansion and contraction of a suitable temperature variable medium. Valve 41 includes, among other parts, a Sylphon bellows 61 which forms a collapsible wall of a fluid-tight chamber 62 in which is contained a gaseous or liquid medium responsive to temperature changes. To one end of the Sylphon bellows there is connected an axially extending valve stem 63, guided by centering supports 64 and 65 and carrying a mushroom type valve member 66 having a valve surface 67 which is adapted to cooperate with a valve seat member 68 to open and close a passageway 69 through which an interchange of air can take place between the low temperature compartment 25 and the interior of container 38. The whole valve assembly is mounted in opening 40 by means of screws 70. An increase of temperature in container 38 above a predetermined value causes the the valve to open and, vice versa, a decrease of temperature causes it to close; and the valve is adjusted to maintain within container 38 whatever temperature range may be desired. This can be accomplished by changing the position of valve member 66 lengthwise of valve stem 63, member 66 being threaded onto valve stem 63 and locked in place by means of a locking nut 71.

In order to make valve 41 responsive to temperature changes in the remote parts of container 38, as well as to changes which occur in its immediate vicinity, I prefer to connect chamber 62 with a temperature-responsive bulb 72 located at the opposite side of container 38. The connection is made by way of a tube 73.

The thermostatically controlled valve 74 regulates interchange of air to container 38 whenever the temperature therein drops below the predetermined low value, is shown in detail in Fig. 11. This valve comprises a Sylphon bellows 75 which is supported at its lower end by a housing 76 and has connected to its upper end a valve stem 77 on which is adjustably mounted a valve member 78. Bellows 75 is filled with an expansible gas or partly filled with a liquid having a suitable volatility such that the bellows will contract and thus open the valve whenever the temperature within container 38 drops below the minimum desired value. The valve remains closed at all other times.

The alternative embodiment of my invention shown in Figs. 14 to 17 is in all respects the same as that of Figs. 1 to 13, except that I have substituted in place of spring member 45 a different mechanism for maintaining the horizontal position of container 38 when the refrigeration unit is tilted to open posture.

A pair of long rods 79 and 80 are pivotally mounted at their lower ends in cups 81 secured to the base of the housing. Said rods extend upwardly at an acute angle to the vertical through openings 82 formed in the two side walls of unit 19; and the upper ends of said rods are each adapted to engage, pivotally, angle brackets 83, 84 attached, respectively, to the two sides of container 38, as shown in Figs. 16 and 17.

As clearly depicted in Fig. 14, rods 79 and 80 do not quite engage the respective brackets 83, 84 when the unit is upright; but as said unit is tilted forwardly, the container dips slightly at its forward end until the brackets rest on the ends of the rods. As portrayed in Fig. 15, container 38 is slightly tilted when the unit is open, but not enough to cause spilling of fluid contents. The reason the rods are made too short to engage the brackets when the unit is upright is that otherwise the front edge of gasket 39 would be lifted to such an extent during the opening movement as to require an inconveniently large vertical movement of cover 42 to effect clearance; and although this would result in avoiding the slight tilt of container 38 depicted in Fig. 15, the advantages, if any, in so doing would not usually offset the disadvantage of having to lift the cover the additional amount required. However, it is not to be supposed that I intend to limit the scope of my invention as respect this feature to an arrangement wherein the rods fall short of engaging the brackets when the refrigeration unit is closed.

The two openings 82 should be made large enough to permit some canting of rods 79 and 80 with respect thereto as the unit is tilted, but it has been found that remarkably little clearance is needed because with the layout shown, the longitudinal axis of each of the two openings passes very nearly through the pivotal center at the lower ends of the rods at every position of the unit between the two extremities of its movement.

A pair of coil springs 85 and 86 are mounted, respectively, on the two rods 79, 80 and press upwardly on the front edge portion of unit 19. These serve to bias the unit toward closed position, and they are long enough to permit the unit to tilt forwardly to the desired extent, as shown in Fig. 15; and they exert their maximum force on the unit when the maximum force is needed. Suitable dashpots preferably should be provided to cushion the return movements of the unit; but since these are adequately shown and described in my above identified copending application, I have omitted to show them in this case.

While I have illustrated and described only two of the preferred embodiments of my invention, it is to be understood that many modifications can be made without departing from the spirit thereof, and, accordingly, I do not wish to be limited except as clearly indicated by the language of the appended claims.

Having thus described my invention and its mode of operation, what I claim as new and wish to secure by Letters Patent of the United States is:

1. The combination in a refrigerator, of a low temperature storage compartment, a container disposed within said compartment and having walls of heat insulating material, and valve means including a temperature responsive operating element for effecting control of the transfer of air between said compartment and the interior of said container, said temperature responsive operating element being responsive to the temperature within said container for maintaining said temperature at substantially a predetermined level higher than that in said compartment.

2. The combination in a refrigerator, of structure defining a low temperature compartment open at the top, a container nested in the top of said compartment and having walls resistant to the transfer of heat therethrough, a heat transfer passageway in one of the walls and opening into the low temperature compartment, a valve for opening and closing said passageway, and means responsive to the temperature in said container for effecting control of the operation of said valve so as to maintain the interior of said container at a predetermined temperture higher than that of the low temperature compartment.

3. The combination in a refrigerator, of structure defining a low temperature compartment open at the top, a container nested in the top of said compartment and having walls of heat insulating material, said container being in heat transfer relationship to the container via a passageway through a wall of the container, said container being movable bodily from said compartment, a valve for opening and closing said passageway, and a temperature responsive element within said container for effecting control of the operation of said valve so as to maintain the interior of said container at a predetermined temperature higher than that of the low temperature compartment.

4. The combination in a refrigerator, of a heat insulated housing having a low temperature compartment therein which is open at the top, a heat insulated cover for said housing, said housing being mounted for tilting movement relative to said cover between open and closed positions, a food storage container nested in the top of said compartment and carried by said housing, said container having walls of heat insulating material, and support means movable relative to said housing during the tilting movement of the housing for automatically maintaining said container at approximately the same level which it assumes when the housing is in the closed position.

5. The combination in a refrigerator, of a heat insulated housing pivotally mounted for tilting movement in a vertical plane between open and closed positions, said housing having a low temperature compartment therein which is open at the top, a cover operative to close said housing when the housing is positioned vertically, means operative to lift said cover to clear the top of said housing during the tilting of the housing relative to the cover between the closed and open positions, a food storage container nested in the top of said compartment and having heat insulating walls, means comprising a spring arm attached to said housing and acting on said container to bias the front portion of the container upwardly so that said container is caused to maintain approximately a level position when the housing is tilted, said cover being spring-pressed downwardly against the top of the container and the top of said housing when the housing is vertically disposed so as thermally to seal both said container and said compartment and to hold the container in a substantially level position against the action of said spring arm.

6. The combination in a refrigerator, of a heat insulated housing pivoted at the bottom for tilting movement in a vertical plane from a closed vertical position to an open angularly disposed position, said housing having a low temperature compartment therein, which is open at the top, a removable food storage container open at the top and nested in the top of said compartment, gasket means secured to the upper edge of said container and in position for engagement with the upper edge of said housing to provide a support for said container and also to provide a thermal seal for said compartment at said upper edge, the interior of said container being thermally insulated from said compartment except for a passageway through the wall thereof which interconnects the interior of said container with said compartment, a valve for opening and closing said passageway, means responsive to the temperature within said container for actuating said valve to open and close said passageway whereby to maintain the interior of said container at a predetermined temperature higher than that in said compartment, a cover for said housing, means for lifting said cover to clear the housing when the latter is tilted, and means operative to support the front edge of said container as the housing is tilted, whereby to maintain said container approximately level so that overturning of the contents of said container is avoided when the housing is tilted.

7. The combination in a refrigerator, of a heat insulated housing pivoted at the bottom for tilting in a vertical plane from a closed vertical position to an open angular position, said housing having a low temperature compartment which is open at the top, a removable food storage container open at the top and nested in the top of said compartment and suspended at the upper edges on a ledge defined by the upper extremity of said housing, means comprising a pair of spring arms disposed one at either side of said container and each anchored at one end to said housing and having its free end underlying the forward portion of the bottom of said container and pressing upwardly thereon, said spring arms being effective to lift the front of said container as the housing is tilted, whereby to maintain the container approximately in an upright position at all times so as to avoid overturning the contents thereof, a cover for said housing, said cover bearing down on said container when the housing is closed so as to maintain the container upright against the pressure of said spring arms, said cover being movable upwardly by said housing when the latter is tilted from the closed position.

CHARLES G. MINOR.

REFERENCES CITED

The following references are of record in the file of this patent:

UNITED STATES PATENTS

| Number | Name | Date |
|---|---|---|
| 1,443,858 | Windecker | Jan. 30, 1923 |
| 2,042,384 | Bird et al. | May 26, 1936 |
| 2,068,550 | Knight | Jan. 19, 1937 |
| 2,322,439 | Heithoff | June 22, 1943 |
| 2,346,287 | Borgerd et al. | Apr. 11, 1944 |
| 2,386,929 | Brown | Oct. 16, 1945 |
| 2,401,613 | Charland | June 4, 1946 |
| 2,408,460 | Van Doren | Oct. 1, 1946 |